(12) United States Patent  
Mitchum

(10) Patent No.: US 7,128,292 B1
(45) Date of Patent: Oct. 31, 2006

(54) DEVICE FOR LIFTING PAPER ROLLS

(76) Inventor: Leonard L. Mitchum, 1213 McLeod Rd., Paxville, SC (US) 29102

( * ) Notice: Subject to any disclaimer, the term of this patent is extended or adjusted under 35 U.S.C. 154(b) by 0 days.

(21) Appl. No.: 11/247,929

(22) Filed: Oct. 10, 2005

(51) Int. Cl.
B65H 19/00 (2006.01)

(52) U.S. Cl. ............... 242/599.2; 242/914; 242/598.3
(58) Field of Classification Search ............ 242/570, 242/598, 598.3–593.4, 599, 599.2–599.4, 242/914; 384/418, 419, 546
See application file for complete search history.

(56) References Cited

U.S. PATENT DOCUMENTS

| 1,711,353 A | * | 4/1929 | Johnson | 242/598.4 |
| 2,851,226 A | * | 9/1958 | Wellington | 242/532.5 |
| 3,618,355 A | | 11/1971 | Brahm et al. | 72/238 |
| 3,743,203 A | * | 7/1973 | Rancourt | 242/599.2 |
| 3,918,775 A | * | 11/1975 | Lehmann | 384/546 |
| 4,831,857 A | | 5/1989 | Levy et al. | 72/181 |
| 6,450,693 B1 | | 9/2002 | Fuchs et al. | 384/538 |

FOREIGN PATENT DOCUMENTS

GB 948884 2/1964

* cited by examiner

Primary Examiner—Kathy Matecki
Assistant Examiner—Sang Kim
(74) Attorney, Agent, or Firm—Charles L. Schwab; Nexsen Pruet, LLC

(57) ABSTRACT

A lifting device for temporarily supporting a trunnion of a paper roll to relieve a bearing and its bearing block of load to facilitate replacement of the bearing. The lifting device includes an arch yoke and a cradle yoke having torque arms which are rigidly interconnected by releasable fasteners and which extend axially alongside laterally opposite sides of the bearing block, thus permitting support members, such as extensible jacks, to be placed beneath the torque arms at laterally opposite sides of the bearing block.

8 Claims, 6 Drawing Sheets

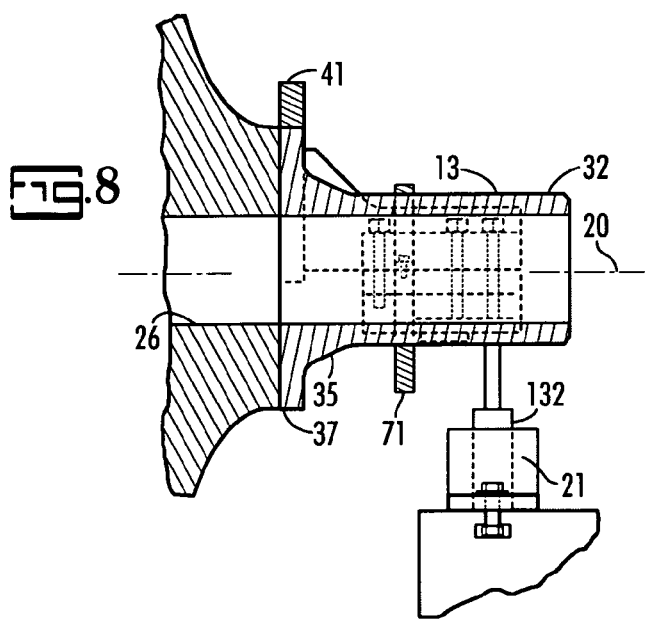
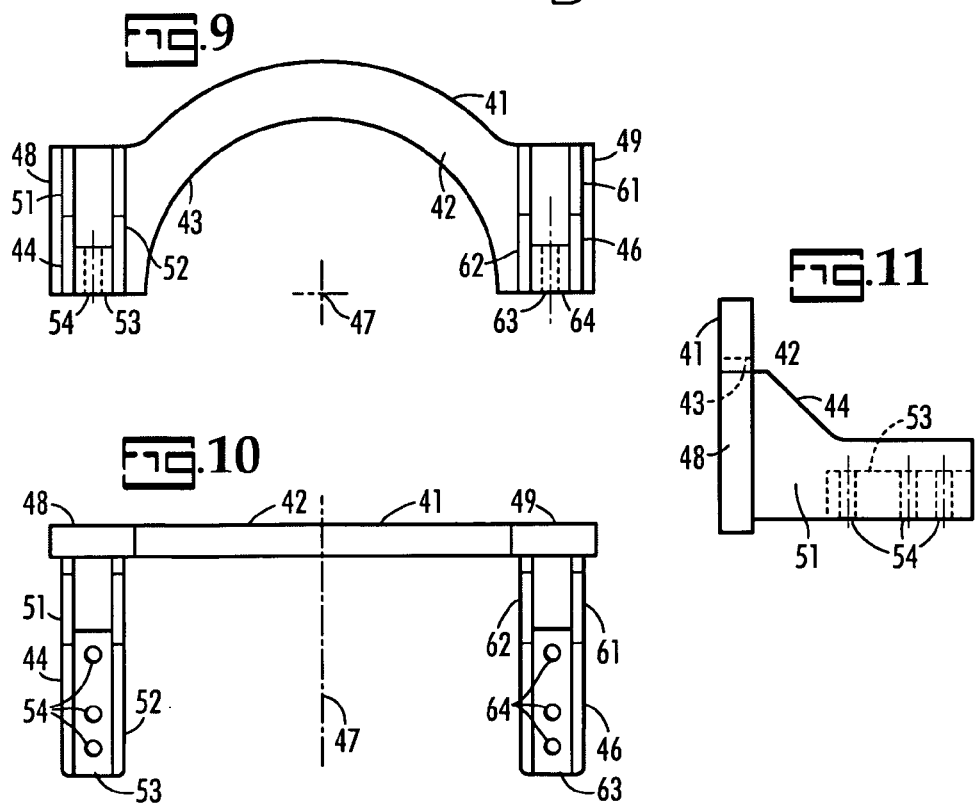

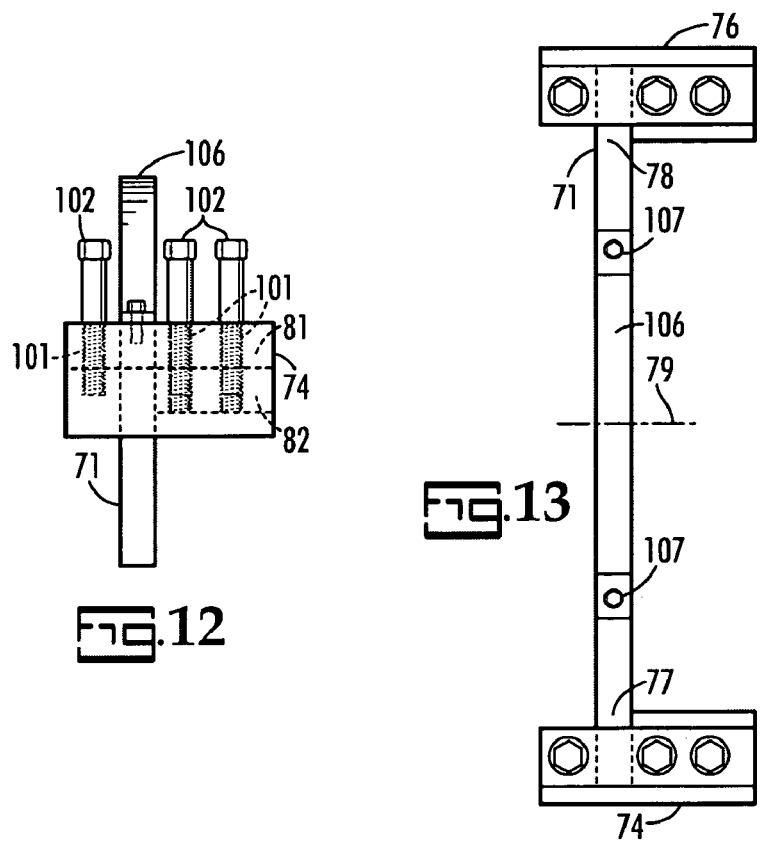
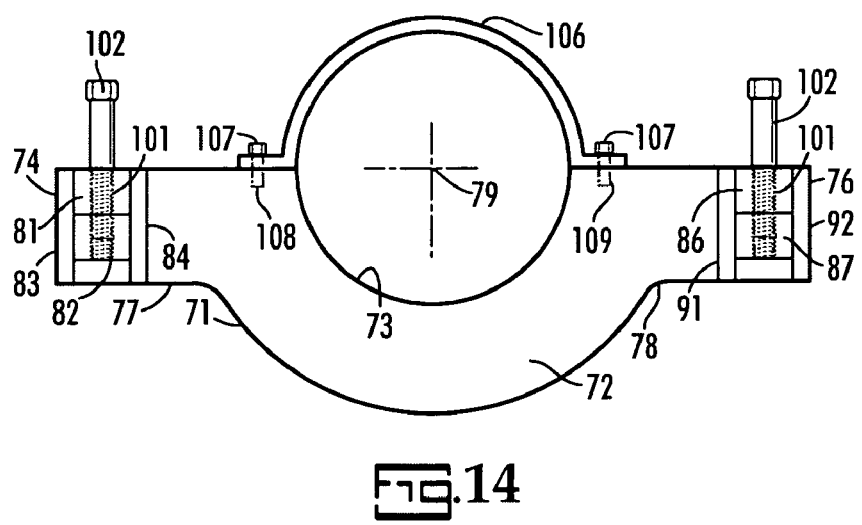

DEVICE FOR LIFTING PAPER ROLLS

BACKGROUND OF THE INVENTION

In the process of making paper from wood pulp, a continuous sheet of damp paper is removed from a supporting web and wound up on a large support roll having relatively large diameter hollow trunnions through which a heating medium is passed to complete the drying of the paper being wound on the roll. The paper roll trunnions are mounted in bearings which are housed in a pair of bearing blocks releasably secured near the edges of horizontal floors of a pair of spaced stationary support structures. Although the bearings are designed to provide a relatively long service life, they eventually will wear with use to such an extent that they need to be replaced. When replacing the bearing, the bearing and the bearing block in which it is installed must be removed from the associated trunnion. The paper roll is very large and hence is quite heavy. The axial end of the paper roll from which the bearing and its bearing block are being removed must be lifted to relieve the bearing of load to permit removal of the bearing block and replacement of the bearing. The bearing block is mounted so close to the edge of the support that it is not possible to place a supporting jack directly under the trunnion when replacing the bearing.

SUMMARY OF THE INVENTION

A device is provided to lift and support a trunnion on one axial end of a paper roll to permit removal of a bearing block and its accompanying bearing. The device includes two releasably interconnected thrust transmitting components, which engage axially spaced top and bottom portions, respectively, of the trunnion. Each of the yokes has a pair of axially extending and horizontally spaced parallel torque arms. The arms are disposed at corresponding lateral sides of the bearing block, are releasably secured to one another and a lifting force is applied to the arms at one or both sides of the bearing block, thereby relieving the bearing block and its associated bearing of the paper roll load.

BRIEF DESCRIPTION OF THE DRAWINGS

One embodiment of the invention is illustrated in the accompanying drawings, in which:

FIG. 8 is a section taken on line 8—8 in FIG. 7;

FIG. 9 is an end view of the upper thrust transmitting component;

FIG. 10 is a top view of the upper thrust transmitting component;

FIG. 11 is a side view of the upper thrust transmitting component;

FIG. 12 is a side view of the lower thrust transmitting component;

FIG. 13 is a top view of the lower thrust transmitting component; and

FIG. 14 is an end view of the lower thrust transmitting component.

DETAILED DESCRIPTION OF THE INVENTION

Figure 1:
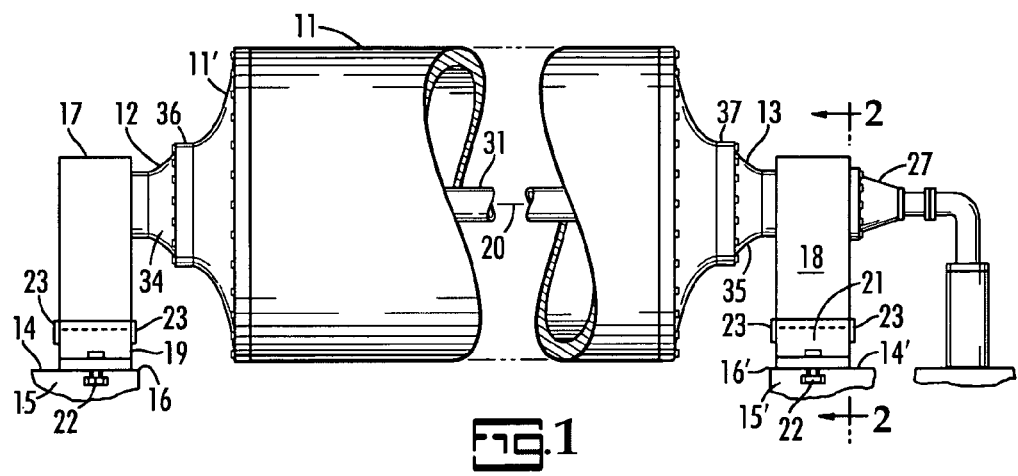
FIG. 1 is a side view of a paper roll and its supporting structure.
Figure 2:
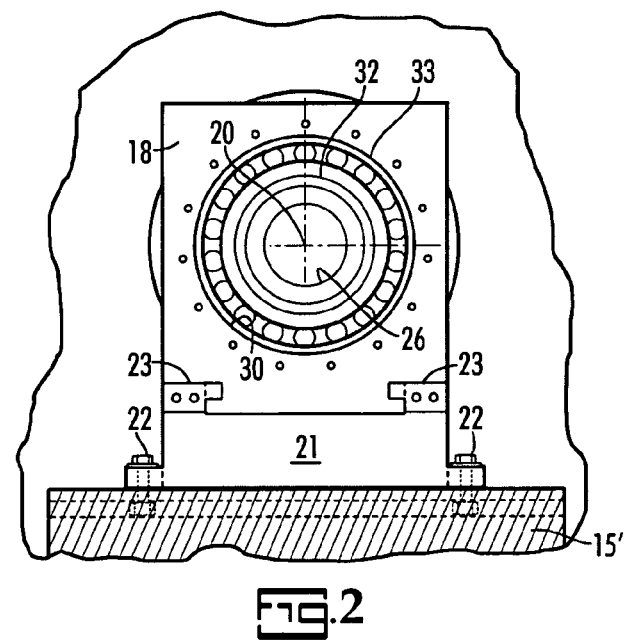
FIG. 2 is a section taken on line 2—2 in FIG. 1.
Figure 3:
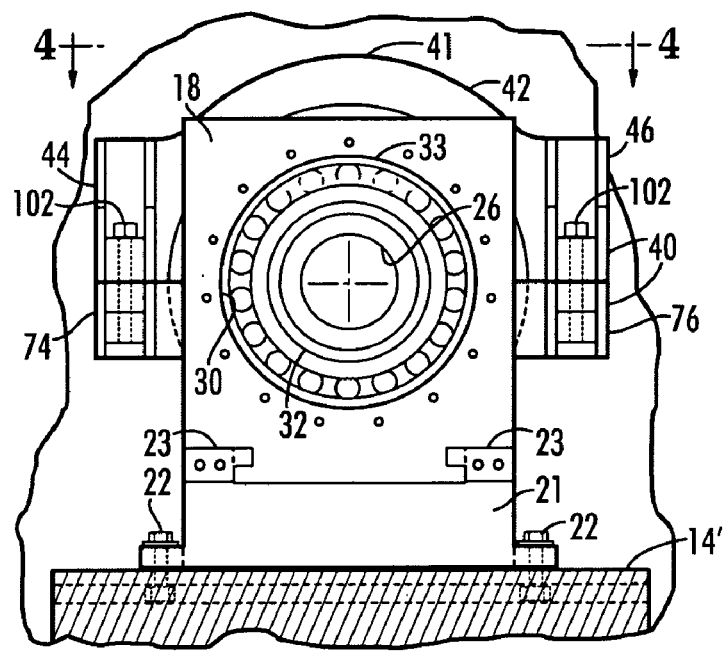
FIG. 3 is an end view with the lifting device installed on one of the paper roll trunnions.

FIG. 1 illustrates a paper roll 11 which has trunnions 12, 13 supported on a foundation, in the form of horizontal floors 14, 14' of a pair of rigid supports 15, 15', by bearing blocks 17, 18 which have a tongue and groove connections with bases 19, 21, respectively, secured to the supports 15, 15' by fasteners 22. The bearing blocks 17, 18 are maintained in supported position on the bases 19, 21 by retainers 23 releasably secured to opposite sides of the bases 19, 21. The bases 19, 21 and the bearing blocks 17, 18 are supported by the floors 14, 14' very close or adjacent to the edges 16, 16' of the supports 15, 15', thereby making it impractical, if not impossible to place a support member directly beneath one of the trunnions 12, 13 of the paper roll 11.

As shown in FIGS. 2, 3, 6, 7 and 8, the trunnion 13 has a central concentric passage 26 through which a heating fluid is transmitted by fluid transmission apparatus 27 to the interior of a spool 11' of the paper roll 11 via interior piping 31 to aid in drying the damp paper being rolled onto the roll 11. A cylindrical end portion 32 of the trunnion 13 is supported in a cylindrical opening 30 of the bearing block 18 by an anti-friction roller bearing 33 for rotation about a drum axis 20. The trunnion 12 is supported in the bearing block 17 in a similar manner. The trunnions 12, 13 have annular flanges 34, 35 with radially outward facing annular or cylindrical shoulders 36, 37, respectively. The flanges 34, 35 are bolted to axially opposite ends of the spool 11' of the paper roll 11.

As illustrated in FIGS. 9 through 14, a lifting device 40 for supporting one axial end of the paper roll 11 has two main thrust transmitting components, namely, an arch yoke 41 and a cradle yoke 71. The arch yoke 41 includes an arch 42 having a downward facing cylindrically shaped surface 43 of the same or slightly larger radius as the cylindrical shoulders 36, 37 of the trunnions 12, 13. A pair of parallel torque arms 44, 46 are rigidly secured to and extend horizontally from opposite ends 48, 49 of the arch 42 and parallel to the axis 47 of the arch surface 43. Arm 44 includes a pair of parallel plates 51, 52 with first corresponding ends welded to one side of the end 48 of the arch 42 and a spacer block 53 between and welded to the plates 51, 52. Three vertical holes 54 are formed in the block 53. The axes of the holes 54 lie in a vertical plane parallel to the axis 47 of the surface 43. The arm 46 is constructed in a similar manner with plates 61, 62 welded to the end 49 of the arch 42, a block 63 welded to the plates 61, 62 and vertical holes 64 in the block 63. The axes of the holes 64 lie in a vertical plane which is parallel to the axis 47.

Figure 4:
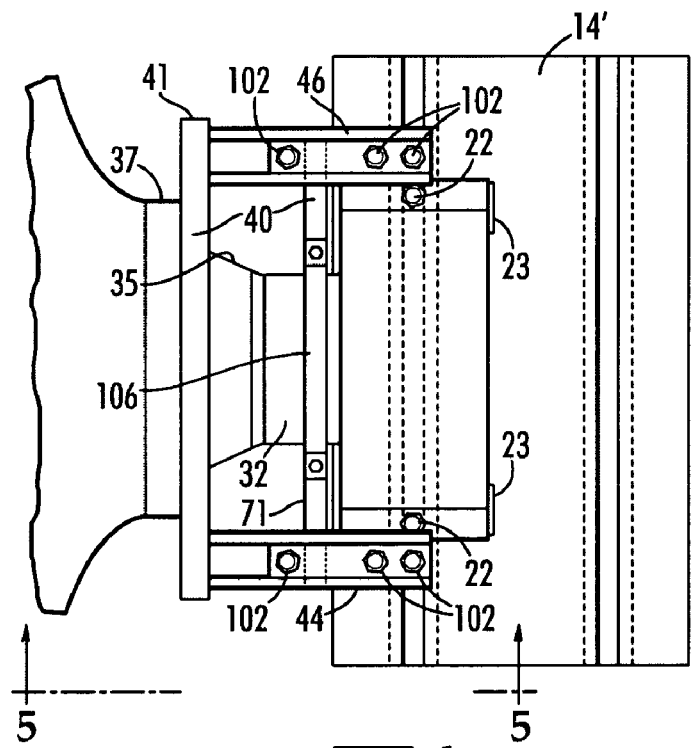
FIG. 4 is a top view taken on line 4—4 in FIG. 3.
Figure 7:
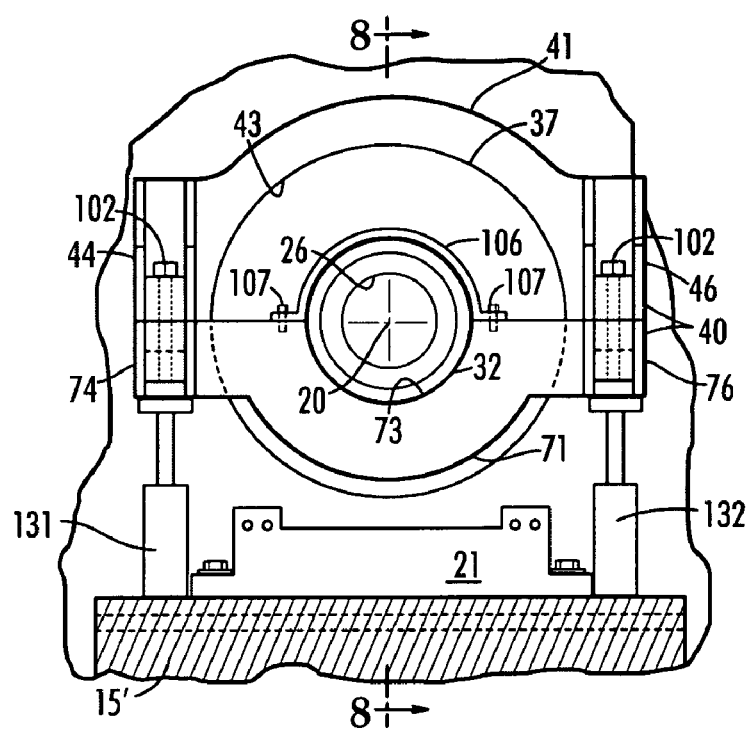
FIG. 7 is an end view showing the lifting jacks and lifting device supporting a paper roll trunnion from which the bearing block and its bearing have been removed.

Referring to FIGS. 12, 13 and 14, the cradle yoke 71 includes bowed cradle 72 presenting an upward facing cylindrical surface 73 of the same or slightly larger radius as the cylindrical end portion 32 of the trunnion 13. A pair of parallel torque arms 74, 76 are rigidly secured to opposite ends 77, 78 of the cradle 72 and extend horizontally at right angles thereto and parallel to the axis 79 of the cylindrical surface 73. Arm 74 includes spacer blocks 81, 82 welded to parallel spaced plates 83, 84 and arm 76 includes spacer blocks 86, 87 welded to parallel spaced plates 91, 92. The spacer blocks 81, 82 of the arm 74 have three threaded vertical openings 101 lying in a vertical plane parallel to the axis 79 of the cylindrical surface 73. In a similar manner the spacer blocks 86, 87 of the arm 76 have three threaded vertical openings 101 lying in a vertical parallel to the axis 79. The threaded openings 101 are spaced axially from one another in the direction of axis 79 and are adapted to receive releasable fasteners in the form of cap screws or threaded studs 102. When the cradle yoke 71 is installed on the trunnion 13, as shown in FIGS. 4, 7 and 8, a semi-circular retainer loop 106 is releasably connected to the cradle 72 by cap screws or fasteners 107 threaded into drilled and tapped vertical openings 108, 109 in the cradle 72. The retainer loop 106 holds the cradle yoke 71 in an appropriate position on the cylindrical end portion 32 of the trunnion 13 thereby facilitating rigid connection of the arch yoke 41 and the cradle yoke 71 to one another, as shown in FIGS. 4 through 8; wherein releasable fasteners in the form of cap screws or threaded studs 102 have been passed through vertical openings 54, 64 in the arms 44, 46 of the arch yoke 41 and threaded into the threaded openings 101 in the arms 74, 76 of the cradle yoke 71.

Figure 5:
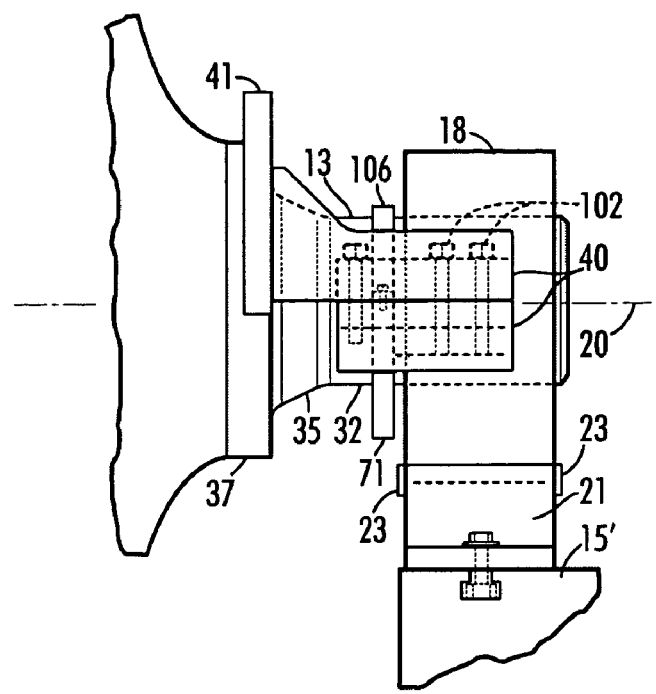
FIG. 5 is a side view taken on line 5—5 in FIG. 4.
Figure 6:
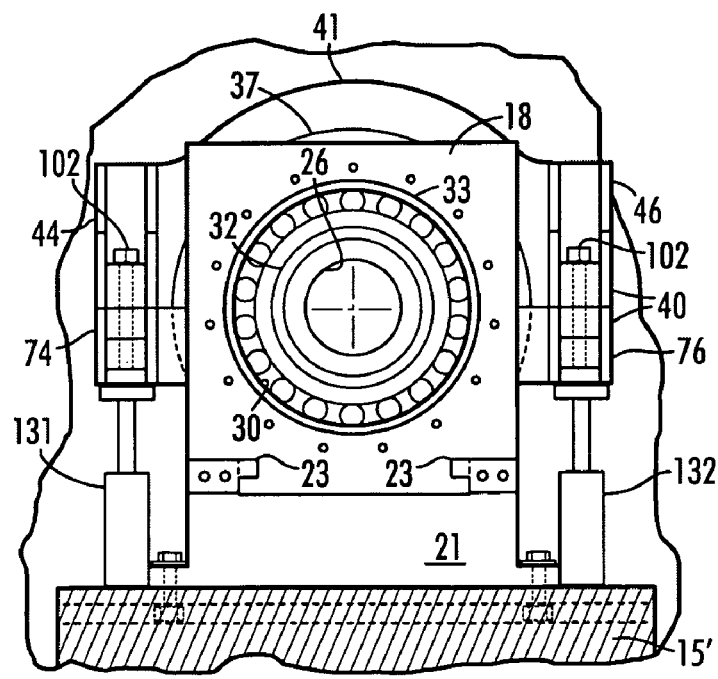
FIG. 6 is an end view showing lifting jacks in supporting relation to the lifting device.

When it has been determined that a trunnion bearing needs to be replaced, the heating fluid delivery apparatus 27 is removed from the bearing block 18, the cradle yoke 71 is installed with the upward facing cylindrical surface 73 in upward thrust transmitting relation to the underside of the cylindrical portion 32 of trunnion 13 between the bearing block 18 and the flange 35 as shown in FIGS. 4 and 5. The retainer loop 106 is then secured to the cradle yoke 71 by releasable fasteners 107. Next the arch yoke 41 is positioned on the trunnion 13 by placing its cylindrical bearing surface 43 in downward thrust transmitting engagement with the cylindrical shoulder 37. The cap screws 102 are then installed through openings 54, 64 and threaded into the tapped openings 101 rigidly interconnecting the yokes 41, 71 to one another. The lifting device 40 is thus coupled to the trunnion 13 as shown in FIGS. 3 through 8. In preparing to remove the bearing block 18 and its bearing 33, the bearing block retainers 23 are removed.

Next, two support members or jacks 131, 132 are placed beneath the torque arms 74, 76, respectively, and at least one of the support members 131, 132 is adjustable to elevate the trunnion 13 a slight amount. When the bearing 33 is thus relieved of the paper roll load the bearing 33 and bearing block 18 can be removed from the trunnion 13 with conventional bearing removal tools. FIG. 7 shows the lifting device 40 and the jacks 131, 132 supporting the trunnion 13. After replacing the bearing 33 with a suitable replacement bearing, the bearing block 18 and the newly installed bearing are installed on the cylindrical end portion 32 of the trunnion 13, the previously extended jack or jacks are lowered and removed, the retainers 23 are installed, the lifting device 40 is removed and the fluid transmission apparatus 27 is reconnected to the bearing block 18.

It will be noted that in supporting the trunnion 13, the torque arms 44, 46 are secured to torque arms 74, 76, respectively, to form a pair of lever arms exerting upward thrust by the cradle yoke 71 and downward thrust by the arch yoke 41. This lever action places an upward thrust on the trunnion 13, relieving the load on the bearing 33 when either or both of the jacks 131, 132 are extended to raise the trunnion 13 a slight amount. The bearing, not shown, in the bearing block 17 can be replaced by following a procedure like that herein described for replacing the bearing 33. The lifting device 40 is advantageously used to replace trunnion bearings in those instances where the bearing block is mounted near the edge of a support and there is insufficient space to place a jack or other lifting device directly beneath the trunnion.

What is claimed is:

1. A lifting device for temporarily supporting a trunnion of a paper roll spool having a foundation to permit removal of a bearing and a bearing block supporting the trunnion, comprising:
    an arch yoke having an arch positionable for downward thrust transmitting engagement with a first part of said trunnion lying between said bearing block and said spool, said arch yoke having a first pair of laterally spaced torque arms extending axially from said arch in a direction axially away from said spool, and
    a cradle yoke having a cradle positionable in upward thrust transmitting engagement with a second part of said trunnion spaced axially between said first part and said bearing block and having a second pair of laterally spaced torque arms extending axially from said cradle beneath and in vertical alignment with said first pair of torque arms, respectively, of said arch yoke, said first pair of arms being releasably securable to said second pair of arms, respectively, and said second pair of arms being adapted for support by a pair of vertical support members disposed at laterally opposite sides of said bearing block and extending upwardly from said foundation.

2. The lifting device of claim 1 wherein said arch includes a downward facing cylindrically shaped surface in engagement with said first part of said trunnion and wherein said yoke includes an upward facing cylindrically shaped surface in engagement with said second part of said trunnion.

3. The lifting device of claim 2 wherein each of said first arms have a plurality of axially spaced vertical holes and wherein said each of second arms have a corresponding number of axially spaced vertical holes, respectively, aligned with said holes in said first arms, said holes being adapted to receive releasable fasteners.

4. The lifting device of claim 3 wherein said holes in said second arms are threaded for reception of threaded fasteners.

5. The lifting device of claim 3 wherein said holes in said second arms are threaded for reception of threaded fasteners.

6. A lifting device providing a temporary support between a foundation and a paper roll, the paper roll having a spool with a trunnion at each of the ends supported by a bearing in a bearing block, said trunnion having a cylindrical end portion adapted to receive an anti-friction bearing and having an annular flange with a cylindrical shoulder between said cylindrical end portion and said spool, said device comprising:
    an arch yoke having an arch disposed for downward thrust transmitting engagement with said cylindrical shoulder including a first pair of laterally spaced torque arms extending axially from said arch in a direction axially away from said spool, and
    a cradle yoke having a cradle disposed in upward thrust transmitting engagement with said cylindrical end portion between said bearing block and said annular flange, and having a second pair of laterally spaced torque arms extending axially from said cradle beneath and in vertical alignment with said first pair of torque arms, respectively, of said arch yoke, said first pair of arms being releasably securable to said second pair of arms, respectively, and said second pair of arms being adapted for support by a pair of vertical support members disposed at laterally opposite sides of said bearing block and extending upwardly from said foundation.

7. The lifting device of claim 6 wherein said arch includes a downward facing cylindrically shaped surface in engagement with said cylindrical shoulder and said cradle includes an upward facing cylindrically shaped surface in engagement with said cylindrical end portion.

8. The lifting device of claim 7 wherein each of said first arms have a plurality of axially spaced vertical holes and wherein each of said second arms have a corresponding number of axially spaced vertical holes, respectively, aligned with said holes in said first arms, said holes being adapted to receive releasable fasteners.

* * * * *